United States Patent [19]
Blomquist

[11] Patent Number: 6,149,746
[45] Date of Patent: Nov. 21, 2000

[54] AMMONIUM NITRATE GAS GENERATING COMPOSITION

[75] Inventor: Harold R. Blomquist, Gilbert, Ariz.

[73] Assignee: TRW Inc., Lyndhurst, Ohio

[21] Appl. No.: 09/369,519

[22] Filed: Aug. 6, 1999

[51] Int. Cl.[7] .......................... C06B 31/28; C06B 33/00; C06B 31/00; B60R 21/28

[52] U.S. Cl. ............................. 149/46; 149/45; 149/37; 149/109.6; 149/123; 149/119; 149/47; 280/740; 280/741

[58] Field of Search ........................................ 149/123, 46

[56] References Cited

U.S. PATENT DOCUMENTS

| | | | |
|---|---|---|---|
| 3,317,276 | 5/1967 | Marion et al. ............................ | 149/46 |
| 3,909,324 | 9/1975 | Niles ........................................ | 149/36 |
| 4,077,820 | 3/1978 | Bolza et al. ........................... | 149/109.4 |
| 4,552,736 | 11/1985 | Mishra ..................................... | 423/266 |
| 5,063,036 | 11/1991 | Engel et al. ............................. | 423/266 |
| 5,292,387 | 3/1994 | Highsmith et al. .................... | 149/19.1 |
| 5,545,272 | 8/1996 | Poole et al. ............................... | 149/48 |
| 5,589,661 | 12/1996 | Menke et al. .......................... | 149/19.4 |
| 5,633,476 | 5/1997 | Cioffe ................................... | 149/109.6 |
| 5,989,367 | 11/1999 | Zeuner et al. ............................ | 149/47 |
| 6,017,404 | 1/2000 | Lundstrom et al. ....................... | 149/36 |

*Primary Examiner*—Charles T. Jordan
*Assistant Examiner*—Glenda L. Sánchez
*Attorney, Agent, or Firm*—Tarolli, Sundheim, Covell, Tummino & Szabo L.L.P.

[57] ABSTRACT

A gas generating composition, when ignited, produces gas to inflate an inflatable vehicle occupant protection device. The gas generating composition comprises ammonium nitrate phase stabilized with a moisture indicating material. The moisture indicating material exhibits a color that changes with change in the concentration of moisture within the ammonium nitrate.

6 Claims, 1 Drawing Sheet

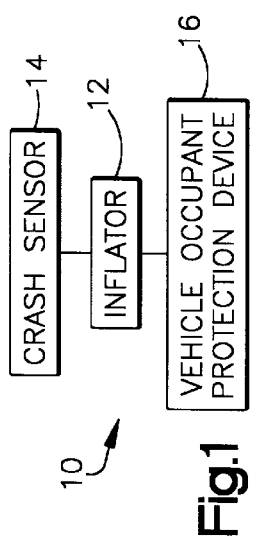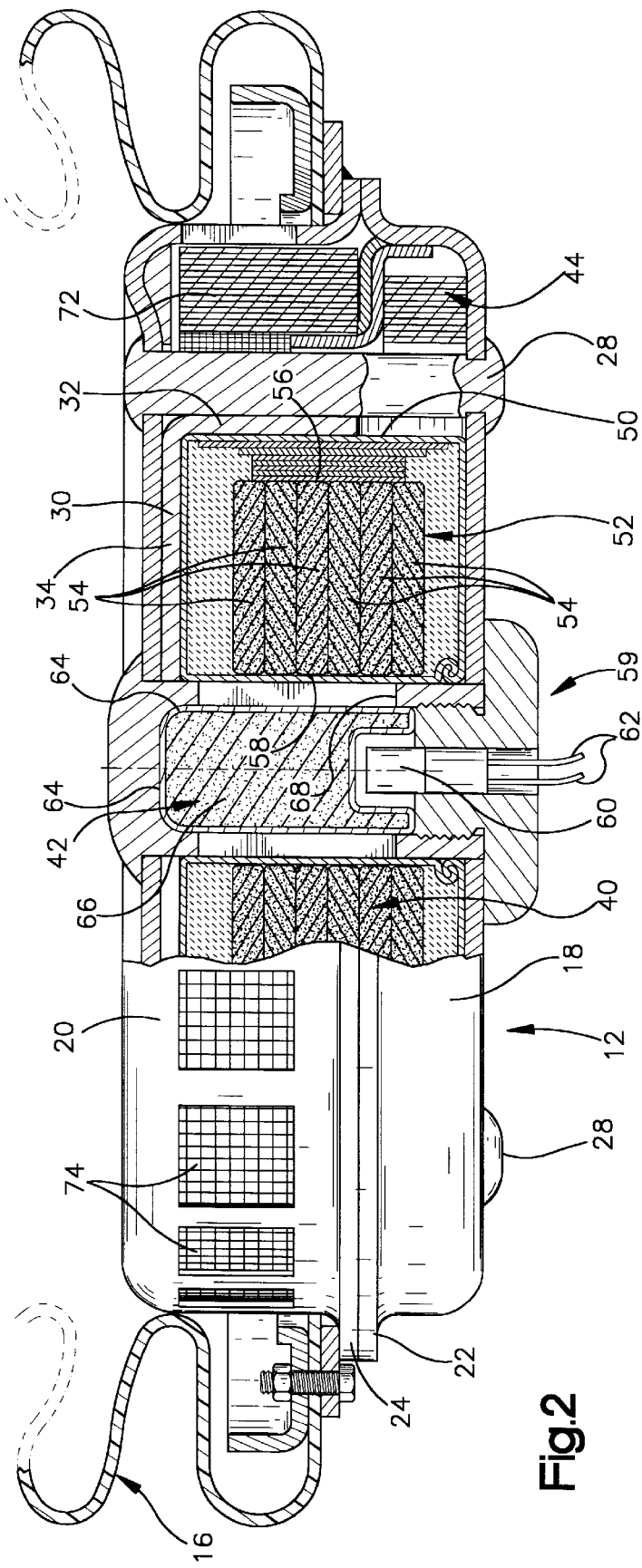

AMMONIUM NITRATE GAS GENERATING COMPOSITION

FIELD OF THE INVENTION

The present invention relates to an apparatus comprising an inflatable vehicle occupant protection device, and particularly relates to a gas generating composition for providing inflation gas for inflating an inflatable vehicle occupant protection device.

BACKGROUND OF THE INVENTION

An inflator for inflating an inflatable vehicle occupant protection device, such as an air bag, contains a body of ignitable gas generating material. The inflator further includes an igniter. The igniter is actuated so as to ignite the body of gas generating material when the vehicle experiences a collision for which inflation of the air bag is desired to protect the vehicle occupant. As the body of gas generating material burns, it generates a volume of inflation gas. The inflation gas is directed into the air bag to inflate the air bag. When the air bag is inflated, it expands into the vehicle occupant compartment and helps to protect the vehicle occupant.

Ammonium nitrate based gas generating compositions for generating gas to inflate an inflatable vehicle occupant protection device have the advantage that they produce non-toxic nitrogen gas during combustion. At the same time, ammonium nitrate based gas generating compositions have some limiting drawbacks. For example, ammonium nitrate has a very low crystal phase stability and passes through five distinct crystal phase changes in the temperature range of about −17° C. to about 169° C. The crystal phase changes cause changes in the density and the volume of the particles of ammonium nitrate. The changes in the density and the volume can result in destruction of the grain integrity of the gas generating composition.

The most disadvantageous crystal phase change of ammonium nitrate is the Phase III↔Phase IV change which occurs at ambient temperature, specifically about 32.3° C. This Phase III↔Phase IV change is characterized by a significant irreversible change in crystal volume of the ammonium nitrate. The crystal phase change at ambient temperature or 32.3° C. can be inhibited by stabilizing the crystal structure of ammonium nitrate with a phase stabilizer such as potassium nitrate.

Nevertheless, ammonium nitrate is hygroscopic and readily absorbs moisture. Moisture can cause hydrolysis of the phase stabilizer and loss of the phase stability. The presence of moisture within the ammonium nitrate also makes the ammonium nitrate difficult to ignite. Accordingly, it may be desirable to examine the ammonium nitrate to ensure that the moisture level within the ammonium nitrate is not above a predetermined level.

SUMMARY OF THE INVENTION

The present invention resides in a gas generating composition which when ignited produces gas to inflate an inflatable vehicle occupant protection device. The gas generating composition comprises ammonium nitrate phase stabilized with a moisture indicating material. The moisture indicating material exhibits a color that changes with change in the concentration of moisture within the ammonium nitrate.

The present invention further resides in a method of monitoring the moisture content of a gas generating composition for inflating an inflatable vehicle occupant protection device. In the method, ammonium nitrate is provided which has been phase stabilized with a moisture indicating material. The moisture indicating material exhibits a color that changes with change in the concentration of moisture in the ammonium nitrate. The ammonium nitrate is inspected to determine the color of the ammonium nitrate. By way of example, the color of the ammonium nitrate is compared with known colors of the ammonium nitrate corresponding to known moisture concentrations.

A preferred phase stabilizing material which exhibits a color change with change in the concentration of moisture in the phase stabilized ammonium nitrate is a transition metal salt, more preferably a copper II salt.

BRIEF DESCRIPTION OF THE DRAWINGS

The foregoing and other features of the present invention will become more apparent to one skilled in the art upon consideration of the following description of the invention and the accompanying drawing in which:

FIG. 1 is a schematic view of a vehicle occupant protection apparatus embodying the present invention; and FIG. 2 is an enlarged, sectional view of a part of the apparatus of FIG. 1.

DESCRIPTION OF PREFERRED EMBODIMENTS

Referring to FIG. 1, a vehicle occupant protection apparatus 10 includes an inflatable vehicle occupant protection device 16. In the preferred embodiment of the present invention, the inflatable vehicle occupant protection device 16 is an air bag. The inflatable vehicle occupant protection device 16 could alternatively be, for example, an inflatable seat belt, an inflatable knee bolster, an inflatable head liner, an inflatable side curtain, or a knee bolster operated by an air bag.

An inflator 12 is associated with the vehicle occupant protection device 16. The inflator 12 is actuatable to generate inflation fluid to inflate the inflatable vehicle occupant protection device 16.

The apparatus 10 also includes a crash sensor 14. The crash sensor 14 is a known device that senses a vehicle condition, such as vehicle deceleration, indicative of a collision or rollover. The crash sensor 14 measures the magnitude and duration of the deceleration. If the magnitude and duration of the deceleration meet predetermined threshold levels, the crash sensor 14 either transmits a signal or causes a signal to be transmitted to actuate the inflator 12. The inflatable vehicle occupant protection device 16 is then inflated and extends into the occupant compartment of the vehicle to help protect a vehicle occupant from a forceful impact with parts of the vehicle.

While the inflator 12 could be a hybrid inflator (not shown), in the preferred embodiment of the present invention, the inflator 12 is a pyrotechnic inflator. The specific structure of the inflator could vary. Referring to FIG. 2, the inflator 12 comprises a base section 18 and a diffuser section 20. The two sections 18 and 20 are joined together at mounting flanges, 22 and 24, which are attached to each other by a continuous weld. A plurality of rivets 28 also hold the diffuser section 20 and the base section 18 together.

A combustion cup 30 is seated between the diffuser section 20 and the base section 18. The combustion cup 30 comprises an outer cylindrical wall 32 and an annular top wall 34. The combustion cup 30 divides the inflator 12 into a combustion chamber 40, which is located within the combustion cup 30, and a filtration chamber 44, which is annular in shape and is located outside the combustion cup 30.

The combustion chamber 40 houses an inner container 50 which is hermetically sealed. The inner container 50 holds gas generating material 52, which is in the form of a plurality of gas generating disks 54. The gas generating disks 54 have a generally toroidal configuration with a cylindrical exterior surface 56 and an axially extending hole defined by a cylindrical interior surface 58. The disks 54 are positioned in the container in a stacked relationship with the axially extending holes in alignment. The cylindrical interior surfaces 58 encircle an ignition chamber 42. Each disk 54 has generally flat opposed surfaces and may have protuberances on such surfaces to space one disk slightly from another. This configuration of the disks 54 promotes a uniform combustion of the disks 54. Other configurations of the gas generating material 52 can also be used.

The ignition chamber 42 is defined by a two-piece, tubular igniter housing 59 that fits within the combustion cup 30 and the disks 54 and contains a squib 60. The squib 60 contains a small charge of ignitable material (riot shown). Electric leads 62 convey a current to the squib 60. The current is provided when the crash sensor 14, which is responsive to a condition indicative of a vehicle collision, closes an electrical circuit that includes a power source (not shown). The current generates heat in the squib 60 which ignites the ignitable material. The ignition chamber 42 also has a canister 64, which contains a rapidly combustible pyrotechnic material 66 such as boron potassium nitrate. The rapidly combustible pyrotechnic material 66 is ignited by the small charge of ignitable material of the squib 60. The burning pyrotechnic material 66 exits from the ignition chamber 42 through openings 68 in the igniter housing, which lead to the combustion chamber 40. The burning pyrotechnic material 66 penetrates the container 50 and ignites the gas generating disks 54. Other ignition systems capable of igniting the disks 54 are well known and can be used with the present invention.

The inflator 12 also comprises a filter assembly 72 in the filtration chamber 44. The filter assembly 72 is in the flow path between the combustion chamber 40 and the vehicle occupant protection device 16. The filter assembly 72 functions to remove solid products of combustion from the combustion gasses and prevent their entry into the vehicle occupant protection device 16. The filter assembly 72 also cools the products of combustion of the disks 54.

The gas generating composition of which the disks 54 are made comprises an oxidizer and a fuel. The oxidizer is ammonium nitrate. Ammonium nitrate is a hygroscopic, white, crystalline salt which evolves upon combustion about 1.70 J/g of heat. The amount of ammonium nitrate in the gas generating composition is that amount necessary to achieve sustained combustion with the fuel. A preferred amount of ammonium nitrate is in the range of about 30% to about 85% by weight based on the weight of the gas generating composition.

The use of ammonium nitrate in the gas generating composition results in a relatively smoke free combustion gas product. The products of combustion of the ammonium nitrate and the fuel are primarily nitrogen, water, and carbon dioxide.

The ammonium nitrate of the present invention is phase stabilized to avoid volumetric and structural changes associated with Phase III↔Phase IV crystal changes when the ammonium nitrate is exposed to ambient temperatures. The phase stabilizer of the present invention is a moisture indicating material. By moisture indicating material, it is meant a material that exhibits a color which changes with change in the concentration of moisture to which the moisture indicating material is exposed. Preferably, the change in color is in the visible spectra and readily discernable by the naked eye. Alternatively, the change in color is in the infrared spectra or the ultraviolet spectra and readily discernable by an infrared scanning device or an ultraviolet scanning device.

Examples of moisture indicating materials that can be used to phase stabilize the ammonium nitrate in the present invention include transition metal salts such as copper II salts. Examples of copper II salts are copper chloride ($CuCl_2$), copper sulfate ($CuSO_4$), copper phosphate ($Cu_3(PO_4)$), copper fluosilicate ($CuSiF_6$), and copper acetate ($Cu(C_2H_3O_2)_2$). Copper II salts in their anhydrous or essentially moisture free form have a white or yellowish-brown color. When exposed to moisture, Copper II salts form highly colored hydrated complexes. For example, copper chloride has a yellowish-brown color in its anhydrous form ($CuCl_2$) and a green color when hydrated ($CuCl_2.H_2O$). Copper sulfate has a white color in its anhydrous form ($CuSO_4$) and a blue color when hydrated ($CuSO_4.H_2O$). Copper phosphate has a white color in its anhydrous form ($Cu_3(PO_4)_2$) and a light blue color when hydrated ($CU_3(PO_4)_2.3H_2O$). Copper fluosilicate has a white color in its anhydrous form ($CuSiF_6.4H_2O$) and a blue color when hydrated ($CuSiF_6.4H_2O$). Copper acetate has a white color in its anhydrous form ($Cu(C_2H_3O_2)_2$) and a greenish-blue color when hydrated ($Cu(C_2H_3O_2)_2.H_2O$).

The amount of moisture indicating and phase stabilizing material in the gas generating composition is that amount which is effective to inhibit the volumetric and structural changes associated with Phase III↔Phase IV crystal changes of ammonium nitrate. Preferably, the amount of moisture indicating material is from about 1% to about 15% based on the weight of the ammonium nitrate.

The phase-stabilized ammonium nitrate can be prepared by mixing particles of ammonium nitrate and particles of moisture indicating material. A sufficient amount of water to dissolve the particles of ammonium nitrate and moisture indicating material is added to the mixture. The aqueous mixture of the ammonium nitrate and moisture indicating material has a first color that is indicative of the moisture indicating material being in a hydrated state. The aqueous mixture is heated, stirred, and then cooled to room temperature (i.e. about 25° C.). The cooled mixture is placed in an atomizer and sprayed in a thin layer onto a sheet. The mixture that is on the sheet is heated in an oven to dry the mixture. The color of the mixture is inspected in the oven. When the color of the mixture changes to a second color indicative of the anhydrous state of the moisture indicating material, the mixture is removed from the oven and cooled to room temperature (i.e. about 25° C.). The phase stabilized ammonium nitrate is then ground in a simple laboratory grinder to produce a particulate mixture of phase stabilized ammonium nitrate suitable for use in a gas generating composition.

Optionally, the phase stabilized ammonium nitrate can be prepared by mixing anhydrous particles of the ammonium nitrate and anhydrous particles of the moisture indicating material. The mixture is heated until the ammonium nitrate is melted and an eutectic is formed. The eutectic is then prilled by allowing molten drops of the eutectic to fall through a fluid cooling medium in a cooling tower. The descending droplets are cooled by an upward flow of the cooling medium and solidified into particles of phase stabilized ammonium nitrate suitable for use in a gas generating composition.

The particles of phase stabilized ammonium nitrate prepared by either of these processes are anhydrous. The moisture concentration advantageously is below 0.5% by weight based on the weight of the phase stabilized ammonium nitrate. At this moisture concentration, the harmful effects that moisture has on the phase stabilized ammonium nitrate are minimized, and the phase stabilized ammonium nitrate is suitable for use in a gas generating composition for inflating a vehicle occupant protection device.

The phase stabilized ammonium nitrate of the present invention exhibits a color that changes as the concentration of moisture within the phase stabilized ammonium nitrate increases and the moisture indicating material becomes hydrated. The color of the phase stabilized ammonium nitrate can be monitored. The phase stabilized ammonium nitrate is unsuitable for use in a gas generating composition for inflating a vehicle occupant protection device when the phase stabilized ammonium nitrate exhibits a color that is indicative of the moisture indicating material being hydrated.

The phase stabilized ammonium nitrate is combined with a fuel to form the gas generating composition of the present invention. The fuel can be any azide or non-azide fuel that is not highly colored and does not interfere with the moisture indicating function of the phase stabilized ammonium nitrate. Preferred non-azide fuels include: cyanamides such as dicyanamide and salts of cyanamides; tetrazoles such as 5-aminotetrazole and derivatives and salts of tetratzole; carbonamides such as azo-bis-dicarbonamide and salts of carbonamide, triazoles such as 3-nitro-1,2,4-triazole-5-one (NTO) and salts of triazoles; guanidine and derivatives of guanidine such as nitroguanidine, salts of guanidine and guanidine derivatives such as triaminoguanidine nitrate or guanidine nitrate; tetramethyl ammonium nitrate; urea and salts of urea; nitramines such as cyclotrimethylenetrinitramine and cyclotetramethylenetetranitramine; and mixtures thereof.

The amount of azide or non-azide fuel in the gas generating composition is that amount necessary to achieve sustained combustion of the gas generating composition. This amount can vary depending upon the particular azide or non-azide fuel and the other reactants that are added to the gas generating composition. Preferably, the amount of azide or non-azide fuel is from about 15% to about 70% by weight based on the weight of the gas generating composition.

The gas generating composition of the present invention preferably includes a binder. Preferably, the binder is non-energetic. Suitable binders for gas generating compositions are well known in the art. Preferred binders include cellulose based binders such as cellulose acetate butyrate (CAB), polycarbonates, polyurethanes, polyesters, polyethers, polysuccinates, thermoplastic rubbers, polybutadiene, polystyrene, and mixtures thereof. A preferred binder is "KRATON", a polyethylene/butylene-polystyrene block copolymer manufactured by Shell Chemical Company. A preferred amount of binder is from about 0 to about 10% by weight based on the weight of the gas generating composition. More preferably, the amount of binder is from about 2.5% to about 5% by weight based on the weight of the gas generating composition.

The present invention may also comprise other ingredients commonly added to a gas generating composition for providing inflation gas for inflating an inflatable vehicle occupant protection device. Such ingredients include other oxidants combined with the ammonium nitrate, plasticizers, process aids, burn rate modifiers, and ignition aids, all in relatively small amounts.

Preferably, the components of the gas generating composition are present in a weight ratio adjusted to produce upon combustion a reaction gas product which is substantially free of carbon monoxide. In other words, the carbon in the reaction mixture is substantially or completely oxidized to carbon dioxide.

The gas generating composition can be prepared by mixing particles of the phase stabilized ammonium nitrate with particles of the fuel in a conventional mixing device. The mixture is compacted into the configuration of the disks 54 described above.

Optionally, the particles of phase stabilized ammonium nitrate and the particles of fuel may be mixed with a liquid to form a liquid slurry. The liquid slurry is dried and the dried mixture is compacted into the configuration of the disks 54 described above.

The moisture content of the gas generating composition can be monitored during and after preparation by inspecting the color of the particles of phase stabilized ammonium nitrate in the gas generating composition. The color of the particles of phase stabilized ammonium nitrate is compared to the color of phase stabilized ammonium nitrate that is anhydrous and to the color of phase stabilized ammonium nitrate in which the moisture indicating material is hydrated.

The gas generating composition is unsuitable for use in an inflator for inflating a vehicle occupant protection device when the phase stabilized ammonium nitrate exhibits a color that is indicative of the moisture indicating material being hydrated. The gas generating composition is suitable for use in an inflator for inflating a vehicle occupant protection device when the phase stabilized ammonium nitrate exhibits a color that is indicative of the moisture indicating material being anhydrous.

EXAMPLE

This Example illustrates the preparation of phase stabilized ammonium nitrate in accordance with the present invention. Ammonium nitrate phase stabilized with a moisture indicating material is prepared by combining, in a conventional mixing device, 95 grams of anhydrous ammonium nitrate and 5 grams of copper sulfate ($CuSO_4$). The ammonium nitrate has a white color. The copper sulfate (CuSO4) has a white color which is indicative of the copper sulfate being anhydrous. An amount of water sufficient dissolve the ammonium nitrate and the copper sulfate is added to the mixture. The aqueous mixture of ammonium nitrate and copper sulfate has a blue color, that is indicative of the copper sulfate being hydrated. The aqueous mixture of ammonium nitrate and copper sulfate is heated to a temperature of about 80° C. and, while at a temperature of 80° C., stirred until the ammonium nitrate and copper sulfate are completely dissolved. The aqueous mixture is cooled to a temperature of about 25° C., placed in an atomizer, and sprayed onto a sheet. The sheet is placed in an oven and heated to a temperature of about 80° C. While at a temperature of about 80° C., the color of the mixture is monitored by visual inspection. Initially, the mixture has a blue color. As the mixture dries in the oven, the color of the mixture changes to pink and then eventually white. The color white is indicative of the copper sulfate in phase stabilized ammonium nitrate being anhydrous and the phase stabilized ammonium nitrate being suitable for use in a gas generating composition for inflating an inflatable vehicle occupant protection device. The anhydrous phase stabilized ammonium nitrate is then ground in a standard grinding device into particles.

Advantages of the present invention should now be apparent. The present invention takes advantage of the favorable processing characteristics of using a moisture indicating material to phase stabilize ammonium nitrate. The color of the phase stabilized ammonium nitrate can be monitored to determine if the phase stabilized ammonium nitrate is suitable for use in a gas generating composition for inflating an inflatable vehicle occupant protection device. The color of the ammonium nitrate can likewise be monitored to determine if a gas generating composition comprising the phase stabilized ammonium nitrate is suitable for use in an inflatable vehicle occupant protection device.

From the above description of the invention, those skilled in the art will perceive improvements, changes, and modifications. Such improvements, changes and modifications within the skill of the art are intended to be covered by the appended claims.

What is claimed is:

1. A gas generating composition which when ignited produces gas to inflate an inflatable vehicle occupant protection device comprising ammonium nitrate phase stabilized with a moisture indicating material, said moisture indicating material exhibiting a color that changes with change in the concentration of moisture within the ammonium nitrate, wherein said moisture indicating material is a transition metal salt.

2. The composition of claim 1 wherein said phase stabilizing material is a copper II salt.

3. The composition of claim 1 wherein the transition metal salt is selected from the group consisting of copper chloride ($CuCl_2$), copper sulfate ($CUSO_4$), copper phosphate ($Cu_3(PO_4)$), copper fluosilicate ($CuSiF_6$), and copper acetate ($Cu(C_2H_3O_2)_2$).

4. An apparatus comprising an inflatable vehicle occupant protection device and a gas generating composition which when ignited produces inflation fluid for inflating the inflatable vehicle occupant protection device, said gas generating composition comprising ammonium nitrate phase stabilized with a moisture indicating material, said moisture indicating material exhibiting a color that changes with change in the concentration of moisture within the ammonium nitrate, wherein said moisture indicating material is a transition metal salt.

5. The apparatus of claim 4 wherein said phase stabilizing material is a copper II salt.

6. The apparatus of claim 4 wherein the transition metal salt is selected from the group consisting of copper chloride ($CuCl_2$), copper sulfate ($CuSO_4$), copper phosphate ($Cu_3(PO_4)$), copper fluosilicate ($CuSiF_6$), and copper acetate ($Cu(C_2H_3O_2)_2$).

* * * * *